UNITED STATES PATENT OFFICE 2,027,100

METHOD OF AGING WHISKY

Carroll A. Hochwalt, Dayton, Ohio, and Charles A. Thomas, Wayne, Pa., assignors, by mesne assignments, to Nelson S. Talbott, Dayton, Ohio No Drawing. Application December 19, 1933, Serial No. 703,154. Renewed June 15, 1935

3 Claims. (Cl. 202—78)

This invention relates to a method of aging green whiskey, such as bourbon or rye.

An object of the invention is to provide a process for the effective removal of undesirable taste and odors commonly known in the industry as "slop" or "green" odor.

Specifically the invention, for its primary object, is based upon the discovery that the utilization of catalytic hydrogen effectively removes the undesirable taste present in green whisky and which, as stated, is characterized as "slop odor" or "green odor."

The method of carrying out our invention consists in intimately contacting green liquor to an atmosphere of hydrogen and the maintenance of saturation of the liquid with the hydrogen being assured by constant agitation. The hydrogen may either be bubbled through the liquid at atmospheric pressure or an atmosphere of hydrogen may be maintained, under pressure higher than atmospheric, in the presence of the green liquor in a closed container.

The catalyst employed is preferably a finely divided solid kept in suspension by the agitation. Thus, for example, platinum, which is most active in the dispersed state, and is known as platinum black, may be employed. This platinum black may be prepared in the following manner: 80 c. c. of a solution of chlor-plantinic acid is prepared from 20 grams of platinum containing a little hydrochloric acid, and is mixed with 150 c. c. of 33% formaldehyde. After cooling to, say, 10° C., 420 grams of 50% KOH are added with violent stirring so slowly that the temperature does not rise above 4 to 6° C. The solution is then warmed for thirty minutes to 55 to 60° C. The platinum black now settles out and may be washed by decantation until the test for chlorides is negative.

However, it will be well understood to those skilled in the art that the catalyst may be prepared by various methods, but the foregoing method has been found to be particularly desirable.

It is also possible to employ finely divided metallic nickel such as is prepared by reducing the nickel oxide in a stream of hydrogen at 300° C. Moreover, any catalyst such as iron, chromium, copper oxide, which has the capability of effecting hydrogenation, may be employed and is contemplated by my process. Our experiments to date, however, indicate that platinum and nickel are peculiarly desirable.

Of course, the quantity of the selected catalyst may be varied within wide limits, and the time required for completion of the liquid varies inversely as the amount of catalyst employed is varied.

As a specific example, however, 1 gram of freshly prepared platinum black may be suspended in 3 liters of green bourbon or rye whisky, agitation started, and a current of hydrogen gas set bubbling through the mixture. The presence of air is to be avoided to prevent the platinum from catalyzing undesirable side reactions between the whisky and the oxygen of the air. Within a relatively short time the odor of the whisky will be found to become more pleasant, due to the disappearance of the green or "slop odor" and its replacement by other more desirable odors.

The time required for the completion of the change in odor of the whisky will vary not only in accordance with the amount of catalyst employed, but upon its specific catalytic activity. This activity will not only be different for different samples, depending upon the exact method of preparation, but will also be different for the same sample at different times. The reason for this is that the catalyst loses activity on exposure to certain chemical substances (poisons) unavoidably present in the whisky, or to excessively high temperatures. However, we have found that a desirable fresh quantity of platinum black catalyst, prepared as above described, will cause the completion of the treatment of the whisky in about thirty minutes.

We have found that 1 gram of platinum black catalyst will treat about 45 liters of green bourbon or rye whiskey, treated in successive portions of 3 liters each; in other words, the platinum black can be used about 15 times before it loses its activity. The exact specification of the amount of catalyst to be used cannot be reliably stated because, as pointed out, the reduction of the amount of catalyst does not cause the reaction to cease but necessitates additional time for adequate treatment of the whisky. In the case of the nickel catalyst, with the use of 1 gram per 3 liters of green whisky, it would require about 5 to 10 hours before the green odor can be satisfactorily removed.

When no further change in odor is observed, the current of hydrogen is turned off and the catalyst removed from the whisky by filtration. It can be used over and over again in the treatment of whisky but finally it loses much of its activity and the time element required for successful treatment of the whisky becomes excessive. In the case of platinum black, the catalyst is recovered and converted into chlor-platinic acid which, in turn, is used to prepare fresh platinum black. There is thus no loss of the catalyst in the process because, after it has lost its activity, it is merely converted back into the original product from which more catalyst can be made. Nickel, because of its cheapness, is probably, as a practical proposition, not worth its process of recovery and reuse.

In carrying out this invention, we have found that the hydrogenation may be performed either at atmospheric pressure or higher pressures. With the use of pressure, the time of completion of the reaction is, of course, considerably shortened. In the case of platinum black, due to its inherent activity, pressure is ordinarily not essential as the time of completion is quite short, but in practicing my invention with the aid of nickel, due to the excessive time required to complete the reaction, pressures should be used. Thus we employ, in the case where nickel is utilized, a pressure which varies from 10 pounds per square inch to 100 pounds per square inch.

Our hydrogenation process has been found to effectively remove the odors and the beverage resulting therefrom can be used immediately. However, the process does not impart color and much of the bouquet of conventionally aged whisky is lacking.

We therefore prefer to follow our hydrogenation process, which may be called a "deodorization process" with a subsequent treatment for the purpose of lending color and aromatics to the whisky. This second step of the process may be performed as follows: White oak, for example, is placed in an externally heated oven of the muffle type and there subjected to a relatively high temperature of approximately 700° C. for approximately 1 to 2 minutes. The high temperature causes a rapid but shallow surface charring or conversion of the white oak. This surface charcoal is quite active but low in alcohol solubles. The insulating effect of the high temperature surface charcoal is most pronounced so that the underlying layers of the white oak are not so drastically heated and the underlying charcoal layers produced are considerably less active but substantially greater in alcohol soluble content. After the heat treatment, the charcoal is removed from the oven where further combustion is substantially immediately terminated, and the char is then in a condition to be removed or scraped from the uncharred portions of the white oak. The exposed or surface layer of the charcoal subjected to the drastic temperature is quite activated and is herein termed layer "A". It is a loosely adhering, flaky charcoal containing a small alcohol soluble content. This need not be employed in view of the fact that the odors have been effectively removed by the hydrogenation process. However, the next or intermediate layer, designated "B", is substantially less activated than the surface layer "A" and contains a materially greater percentage of alcohol solubles. The innermost or shielded charcoal layer is designated "C" and is still less destructively heated, and is increasingly richer in alcohol solubles.

We therefore employ layers "B" and "C" which contain substantial quantities of alcohol soluble material. The whisky which has been deodorized by our hydrogenation process is, in accordance with this second step of our process, heated in the presence of the "char" to approximately 80° C. or just below its boiling point.

Specifically, 100 c. c. of the hydrogenated or deodorized bourbon whisky is added to 1.5 grams of composite charcoal consisting of 25% of the "B" char and 75% of the "C" char. The proportion of 1.5 grams may be varied between 0.25 to 6 grams per 100 c. c. without materially affecting the quality. The time of refluxing is considerably shortened by the use of the hydrogenating step. Thus, in the hydrogenated bourbon whisky, the desirable change in color and aromatics takes place in about 3.5 hours. The limits on this refluxing period may vary from 1 hour to 15 hours, but we have found that 3.5 hours is sufficient to make a very good product. Hydrogenated rye whisky is treated by refluxing 100 c. c. with 4 grams of composite char consisting of 25% "B" char and 75% "C" char. A time in the neighborhood of 15 hours apparently is required or desirable for rye whisky. The proportion of 4 grams may be varied from about 0.25 grams to 6 grams.

The second step of our process as described ages the whisky quite succesfully and imparts to it the desirable taste, flavor, aroma, color, etc. of a whisky which has been naturally aged for many years. The alcohol solubles contain an adequate quantity of wood tar distillate which has been referred to as "alcohol solubles" and it has been discovered that refluxing such char, as above described, is peculiarly effective for the aging of whisky which has been treated in accordance with the first step of our process, by the hydrogenation method.

What we claim is:

1. The method of chemically deodorizing and of aging green whisky which comprises the steps of distributing a finely divided hydrogenating catalyst in a body of green whisky, in deodorizing the green whisky by reacting the odoriferous constituents of the whisky with hydrogen in the presence of the hydrogenating catalyst, while maintaining the same under pressure sufficient to effect chemical hydrogenation of the odoriferous constituents, continuing the reaction under said conditions until the green whisky has been substantially deodorized, in subjecting the deodorized whisky to the action of finely divided wood char containing predetermined quantities of alcohol solubles, and heating the same in the presence of the finely divided wood char until the deodorized whisky has been sufficiently aged by the said solubles.

2. The method of chemically deodorizing and of aging green whisky which comprises the steps of distributing a finely divided hydrogenating catalyst in a body of green whisky, in deodorizing the green whisky by reacting the odoriferous constituents of the whisky with hydrogen in the presence of the hydrogenating catalyst while maintaining the same under pressure sufficient to effect chemical hydrogenation of the odoriferous constituents and in a substantially non-oxidizing atmosphere, continuing the hydrogenating reaction under said substantially non-oxidizing atmosphere until the green whisky has been substantially deodorized, in subjecting the deodorized whisky to the action of finely divided wood char containing predetermined quantities of alcohol solubles, and heating the same in the presence of the finely divided wood char until the deodorized whisky has been sufficiently aged by the action of the said solubles.

3. The method of chemically deodorizing green whisky which comprises the steps of treating the green whisky with a finely divided hydrogenating catalyst, in deodorizing the green whisky by reacting the odoriferous constituents of the whisky with hydrogen in the presence of the hydrogenating catalyst while maintaining the same under pressure sufficient to maintain chemical hydrogenation of the odoriferous constituents in a substantially non-oxidizing atmosphere, continuing the hydrogenation reaction under said substantially non-oxidizing atmosphere until the green whisky has been substantially deodorized, and subjecting the thus deodorized whisky to treatment with charred wood containing alcohol solubles and continuing such treatment until the whisky has been sufficiently aged by said solubles.

CARROLL A. HOCHWALT.
CHARLES A. THOMAS.